United States Patent [19]
McSherry

[11] Patent Number: 5,944,295
[45] Date of Patent: *Aug. 31, 1999

[54] COMBINATION WALL ANCHOR FASTENER AND FIXTURE

[75] Inventor: Thomas W. McSherry, Temple, Pa.

[73] Assignee: Cobra Anchor Co., Ltd., East Montreal, Canada

[ * ] Notice: This patent is subject to a terminal disclaimer.

[21] Appl. No.: 08/786,781

[22] Filed: Jan. 21, 1997

[51] Int. Cl.⁶ .................................................. F16B 45/00
[52] U.S. Cl. .................. 248/304; 411/387.7; 411/387.2; 411/400
[58] Field of Search .................... 411/400, 401, 411/396, 397, 386, 368, 369, 533, 387.1, 387.8; 248/497, 304, 339, 301

[56] References Cited
U.S. PATENT DOCUMENTS

| | | | |
|---|---|---|---|
| 126,366 | 4/1872 | Wills | 411/387 |
| 2,266,892 | 12/1941 | Mullen | 411/386 |
| 2,275,007 | 3/1942 | Caestecker . | |
| 2,672,069 | 3/1954 | Mitchell | 411/533 |
| 3,118,718 | 1/1964 | Babey | 411/368 |
| 5,160,225 | 11/1992 | Chern | 411/387 |
| 5,267,423 | 12/1993 | Giannuzzi | 411/533 |
| 5,511,301 | 4/1996 | McGuire | 411/533 |
| 5,529,449 | 6/1996 | McSherry | 411/387 |

*Primary Examiner*—Flemming Saether
*Attorney, Agent, or Firm*—Nolte, Nolte & Hunter

[57] ABSTRACT

An outwardly threaded, hollow cylindrical wall anchor with a flange at its proximal end and a cutter at its distal end and a workpiece having an aperture through which the anchor is threaded while the anchor is inserted in a wall or the like.

1 Claim, 3 Drawing Sheets

1

COMBINATION WALL ANCHOR FASTENER AND FIXTURE

FIELD OF THE INVENTION

An outwardly threaded, hollow cylindrical wall anchor with a flange at its proximal end and a cutter at its distal end and a workpiece having an aperture through which the anchor is threaded while the anchor is inserted in a wall or the like.

THE PRIOR ART

The Ernst et al, Giannuzzi and McSherry U.S. Pat. Nos. 4,601,625, 5,234,299 and 5,529,449, respectively, each disclose an anchor which is turned in a wall made of friable material and is retained in the wall by virtue of the friable material being compressed between the root and deep thread spiraled along the cylindrical body of the anchor and between the proximal end of the thread and flanged end of the anchor which becomes embedded in the front surface of the wall. A work piece is then fastened to the wall by a screw fastener which is screwed into the open end of the anchor and holds the workpiece between the flanged end of the anchor and the head of the screw fastener.

THE INVENTION

The invention eliminates the necessity of a screw fastener to hold the workpiece against the embedded flange of an anchor by providing a deeply spiraled threaded fastener fabricated as a wall anchor for insertion and tapping into wall board and the like and having a flange at a proximal end spaced a predetermined axial distance from the proximal end of the thread of the fastener, mated with the peripheral surface or surfaces forming an aperture in a workpiece. The thickness of the workpiece surrounding the aperture is substantially equal to the predetermined axial distance between the flange and proximal end of the thread of the fastener. The aperture of the workpiece is larger than the diameter of the root of the tapping thread, but smaller than the turns of the spiraled thread of the anchor nearest the flange, and the peripheral surface (or surfaces) of the aperture forms a seat for the distal side of the flange of the anchor when the anchor is inserted in the wall board holding the workpiece between the distal side of the flange and the outer surface of the wall board with the wall board material wedged within the spiraled threads around the root of the anchor; that is, the outer cylindrical surface of the anchor.

In this last respect, it should be noted that the workpieces may be modified to have their apertures fit a known wall anchor or a wall anchor may be modified to have its flanged end fit the aperture of known workpieces. It is preferable to have the anchor and workpiece manufactured to fit together for consistency of performance and acceptance as a unit.

The invention contemplates the provision of a combination of a wall anchor and a workpiece, the anchor comprising a hollow cylindrical body with a flanged end and a cutting end, with a deep tapping thread extending along the outside of the cylindrical body and with a through bore extending along its central axis at least partially opened at its cutting end to permit entry of wall material cut by the cutting end as the anchor is inserted then rotated in the wall material. The workpiece conventionally comprises an attachment fixture, such as a hook or shelf stanchion, and can comprise the attached fixture itself. The workpiece has an aperture of a size to permit the threading through of the tapping thread of the wall anchor and provide a seat for the distal side of the flange of the flanged end of the anchor.

The combination anchor and workpiece of the invention results in quick installation of the workpiece and proper positioning of the workpiece relative to the axis of the anchor/fastener. Furthermore, the use of the anchor as the fastener retains the holding strength of the anchor in the wall and eliminates the problem of applying excessive torque when driving a screw fastener into a wall anchor. The wall anchor of the contemplated combination can be removed and reused if it is desired to move the workpiece which may be a fixture of any kind.

DETAILED DESCRIPTION OF THE INVENTION

Figure 2:
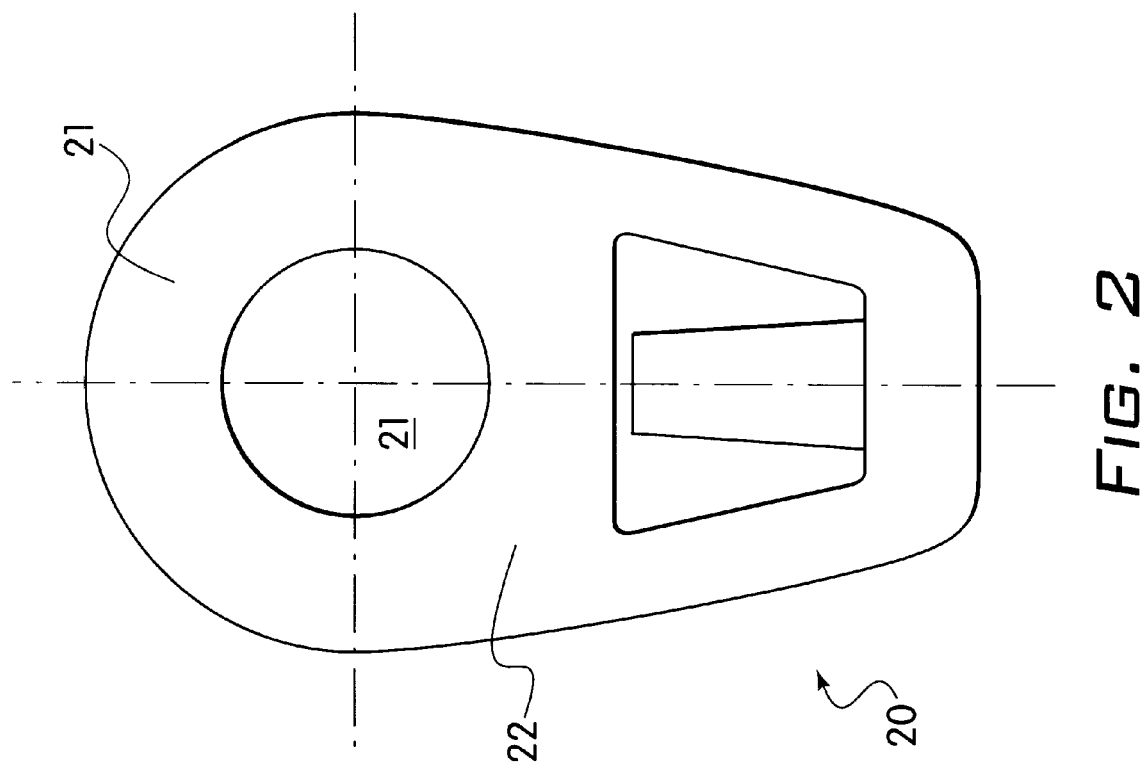
FIG. 2 is a rear view of the workpiece of FIG. 1.
Figure 1:
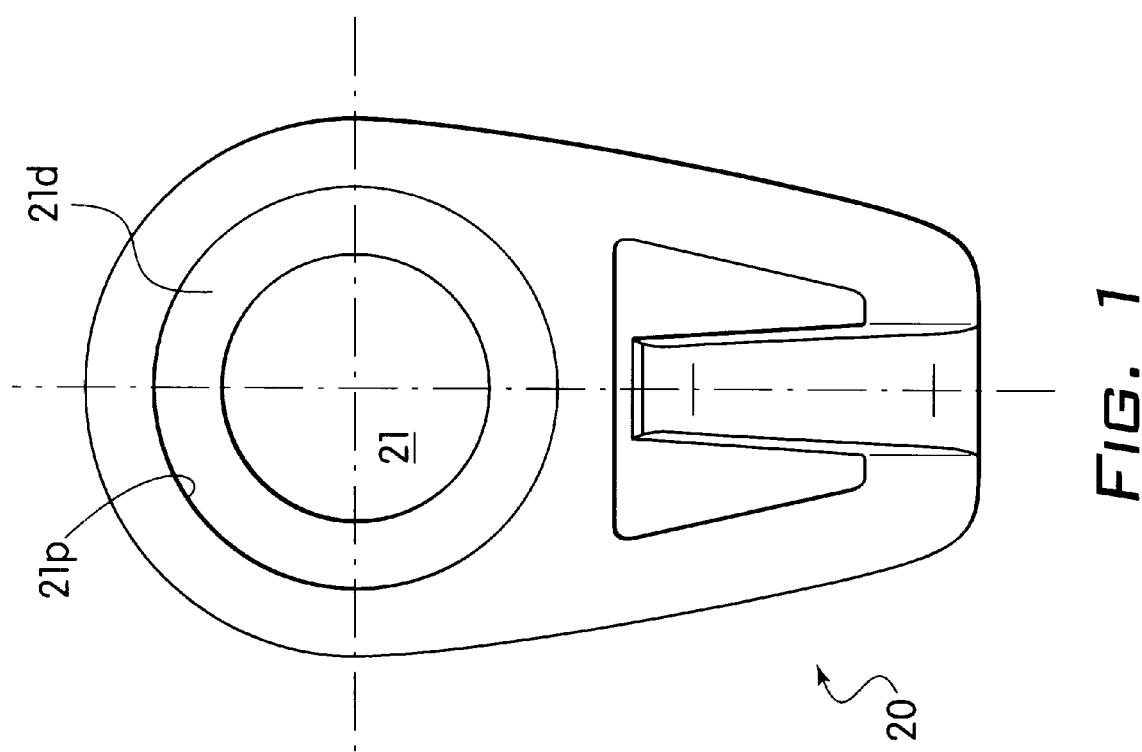
FIG. 1 is a frontal perspective view of a workpiece, in this instance a hook, incorporating interfitting features for mating with a wall anchor.
Figure 3:
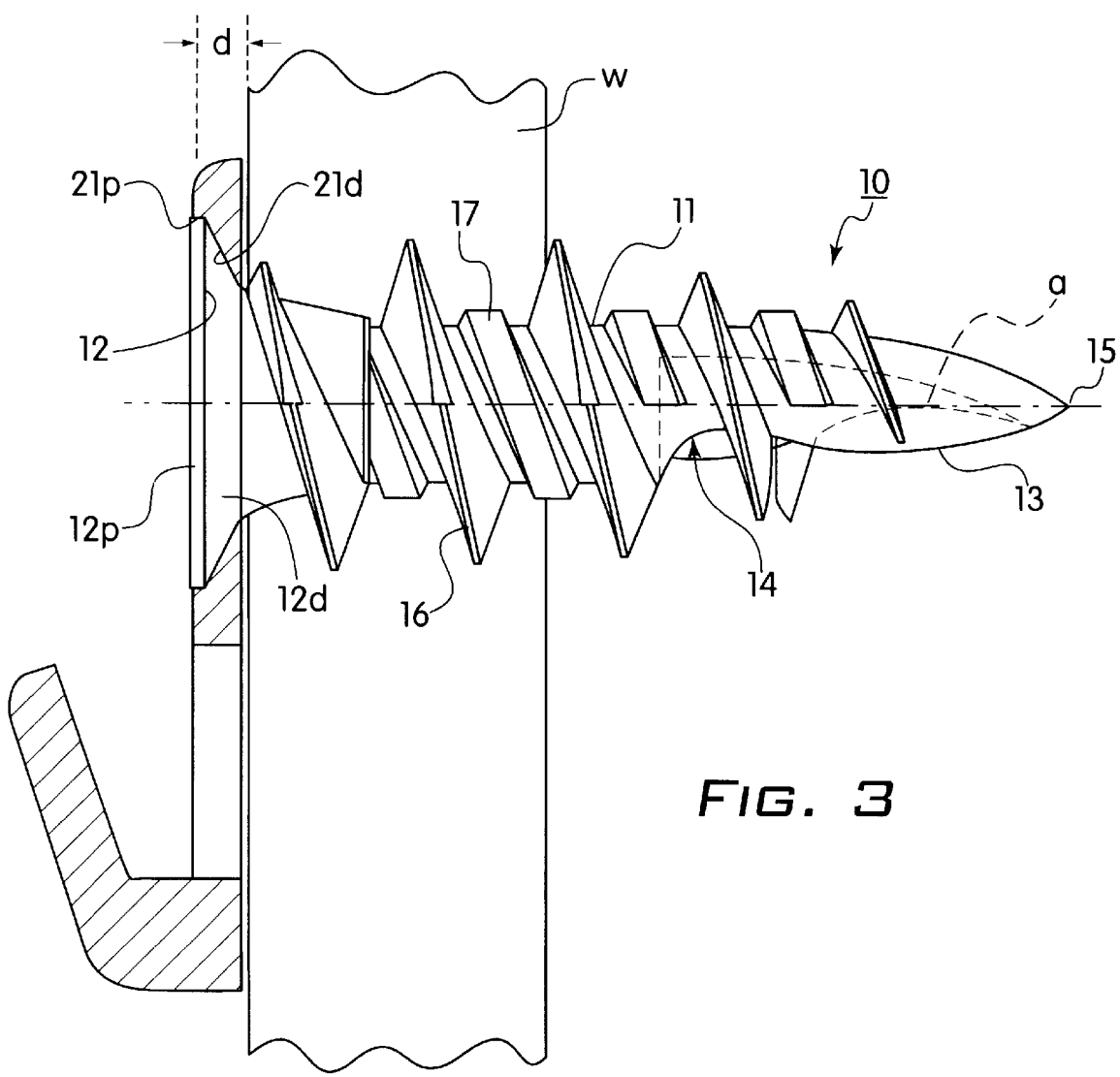
FIG. 3 is a sectional view of the workpiece of FIGS. 1–2 taken along the line 3—3 of FIG. 1 with a side view of a wall anchor in place, centering and holding the workpiece against a wall surface.
Figure 4:
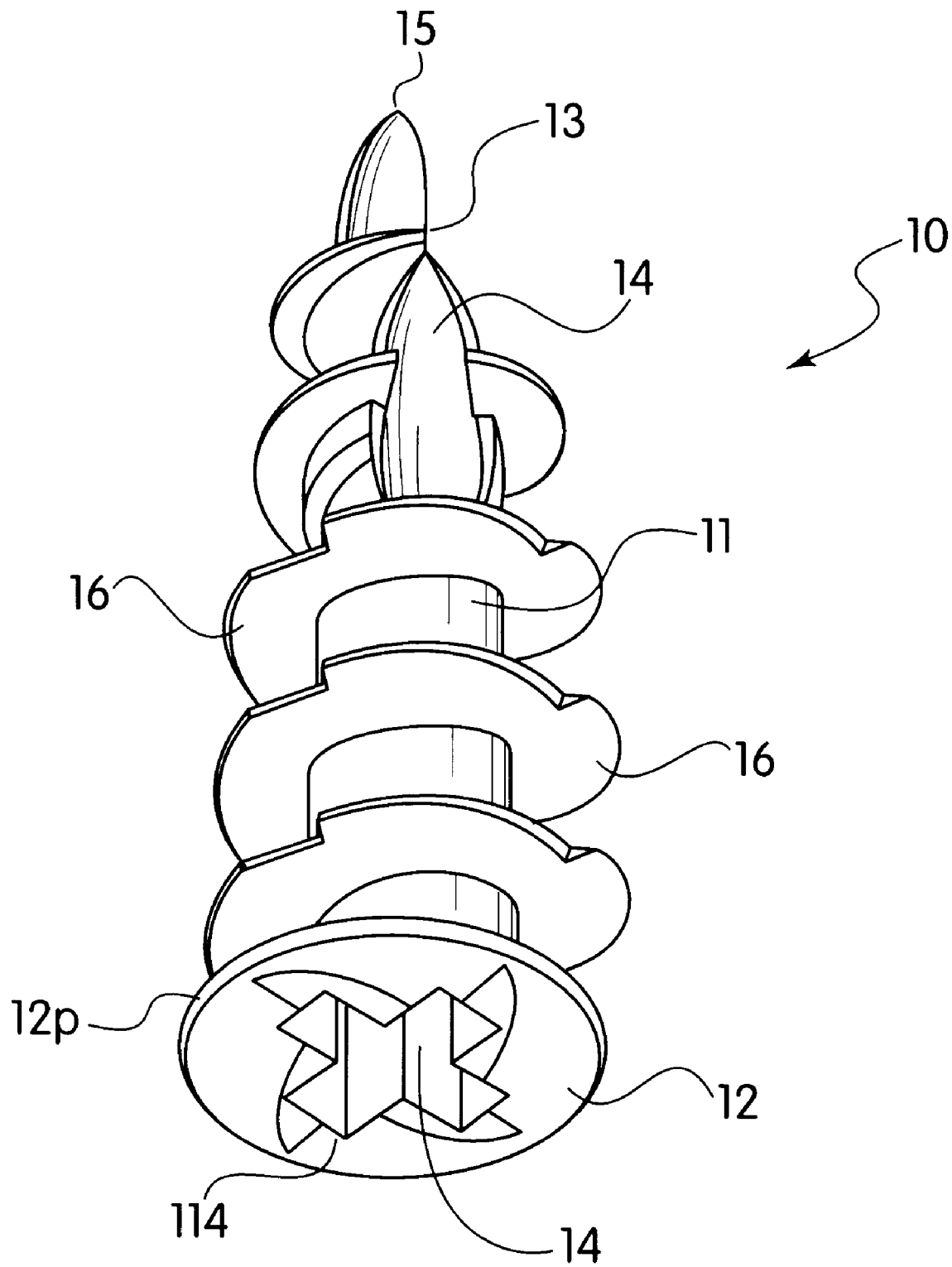
FIG. 4 is a bottom perspective view of the wall anchor of FIG. 3.

The wall anchor 10, shown in FIG. 3, is of the type fully disclosed in U.S. application Ser. No. 08/556,984, filed Nov. 15, 1995, incorporated herein by reference. It has a cylindrical body 11 with a flange 12 at its proximal end and a single cutter 13 at its distal end. A through bore 14, extends from the flanged end to the cutting end where it is partially closed because of the dome shape of the cutting end which disposes the tip of the cutting end 15 at the center axis a of the anchor. A deep tapping thread 16 spirals around the cylindrical body 11 which constitutes the root of the tapping thread, from near the flange 12 where its diameter is the largest, to adjacent the tip 15 where its size is diminished for easy entry into the wall material as soon as the cutting end penetrates the wall. In this way, the anchor screws into the wall without the need for drilling.

The proximal end of the through bore is formed, as at 114, to accept a torque producing tool to rotate the anchor thereby driving it into a wall once the tip is inserted in the wall and the distal terminal end of the thread enters the wall and assists drawing the anchor through the wall material in screw-like fashion. A compression band 17 extends between the turns of the thread to increase the compacting pressure of the wall material against the body of the anchor between the turns of the thread.

As the anchor is turned with the cutting end inserted in the wall, it advances because of the threads and the cutting edge 17 cuts the wall material. The bore at the distal end receives wall material cut by the cutter so that the material is not pushed to explode at the exit surface of the wall to thereby weaken the holding capacity of the anchor.

In the particular construction of the anchor shown, the distal surface of the flange 12d diverges from the cylindrical body to the periphery of the flange which forms a round cylindrical surface as seen at 12p. The proximal terminal end of the thread is disposed a predetermined distance d from the flange to accommodate the workpiece 20, in this instance, a hook fixture.

The hook fixture 20 is formed with an aperture 21, the circumferential surfaces of which form diverging surface 21d and round cylindrical surface 21p which mate with surfaces 12d and 12p, respectively, of the flange 12 of the anchor to dispose the back surface 22 of the fixture against the outer surface of wall W and closely adjacent the proximal terminal end of thread 16 so that the wall material is tightly compacted at the proximal end of the anchor between the turn of the thread and the back of the fixture.

The distance between the proximal terminal end of the thread and the proximal surface of the flange is approximately equal to the width of the fixture at the fixture supported site. Importantly, the diameter of the aperture through which the anchor is inserted is smaller than the diameter of the flange and only slightly smaller than the height of the end turn of the spiral of deep threading near the proximal end of the anchor.

The size of one typical anchor produced by Cobra Anchors Co. Ltd. of East Montreal, Canada, includes a proximal flange diameter of little more than approximately ½" with an average diameter of the cylindrical body, before the body diminishes to a point at the distal end, of approximately ¼" and with a depth (or height) of the threading near the flanged end of approximately ⅛". The diameter of the aperture of a hook to be used in combination with the just-described anchor should, therefore, be slightly less (a ¹⁄₁₆ or so) than ½". This permits the terminal end of the thread to spiral through the aperture with the circumference of the hole near or resting on the root surface of the threading, in this instance, the body of the anchor.

The hook is hung on the distal end of the anchor as the anchor is inserted through the hook aperture and the wall. As the anchor is turned, the hook rides between the turns of the thread until passing the last proximal end turn of the thread when it becomes pressed against the wall by the flange. As this occurs, the anchor and hook act to center the hook on the anchor and simple operator manipulation centers the hook in the vertical.

I claim:

1. The combination consisting of a fixture, and an anchor for insertion directly into friable wall board material, said anchor comprising a cylindrical body extending along a center axis and having a radially extending flange at a proximal end, said cylindrical body diminishing in diameter along a distal cutting end and forming a pointed dome with a centering tip disposed at the center axis of said anchor, an outer thread extending substantially along the length of said cylindrical body and an axial passage extending from an opening at said proximal end of said body to an opening at said distal cutting end of said body where said bore is partially closed because of the diminishing diameter of said cylindrical body and the disposition of said centering tip at the center axis of said anchor, recess means at said proximal end for receiving a drive tool for rotating said anchor for cutting through the wall board with said distal cutting end, said opening of said bore at said distal cutting end of said anchor extending along only one side of said distal cutting end and comprising access means along said only one side of said distal cutting end communicating with said axial passage for passing material cut from the wall board into said axial passage, said opening of said bore at said distal end of said anchor being defined by a leading edge and a trailing edge of a single cutter, said edges extending from said centering tip in diverging spiral paths, said outer thread extending from said proximal end adjacent said flange to adjacent said single cutter and comprising means for tapping the wall board material and for pulling said anchor through the wall board material as said single cutter rotates without drilling a hole through the wall board in advance of said thread, said outer thread having a high turn adjacent said flanged proximal end;

wherein said outer thread extends from said proximal end to adjacent said centering tip;

wherein said outer thread is interrupted at said opening of said bore at said distal cutting end of said body to provide uninterrupted access at said opening for wall material;

wherein said leading edge is distended along an outwardly curved edge extending from said centering tip;

said fixture comprising a body having a front surface including integral attachment means extending outwardly of said front surface of said fixture and a flat back surface, said fixture body defining an aperture having a circumferentially uninterrupted periphery with a diameter larger than a predetermined diameter of said cylindrical body and smaller than a predetermined diameter of said flange, said flange having a circumferentially uninterrupted periphery and comprising means when said anchor is rotated into wall material for pressing against said fixture front surface about said periphery of said fixture body aperture and comprising the sole means for retaining said flat back surface of said fixture directly against a flat front surface of wall material.

* * * * *